Aug. 31, 1954   J. H. GRIFFITH ET AL   2,687,929
ANCHORAGE FOR THRUST BEARING HOODS OF ROLLING MILL ROLLS
Filed Dec. 24, 1953   3 Sheets-Sheet 1
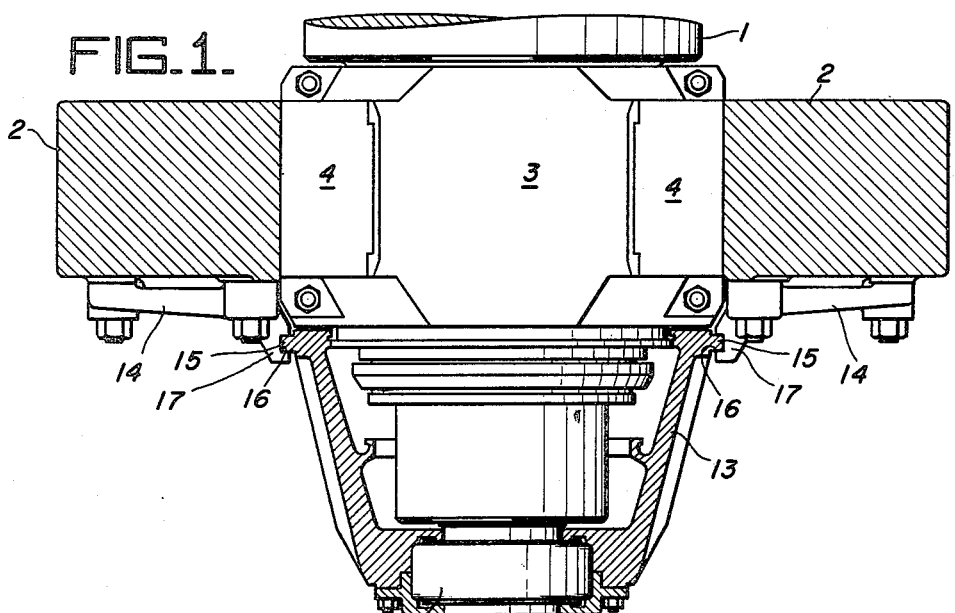
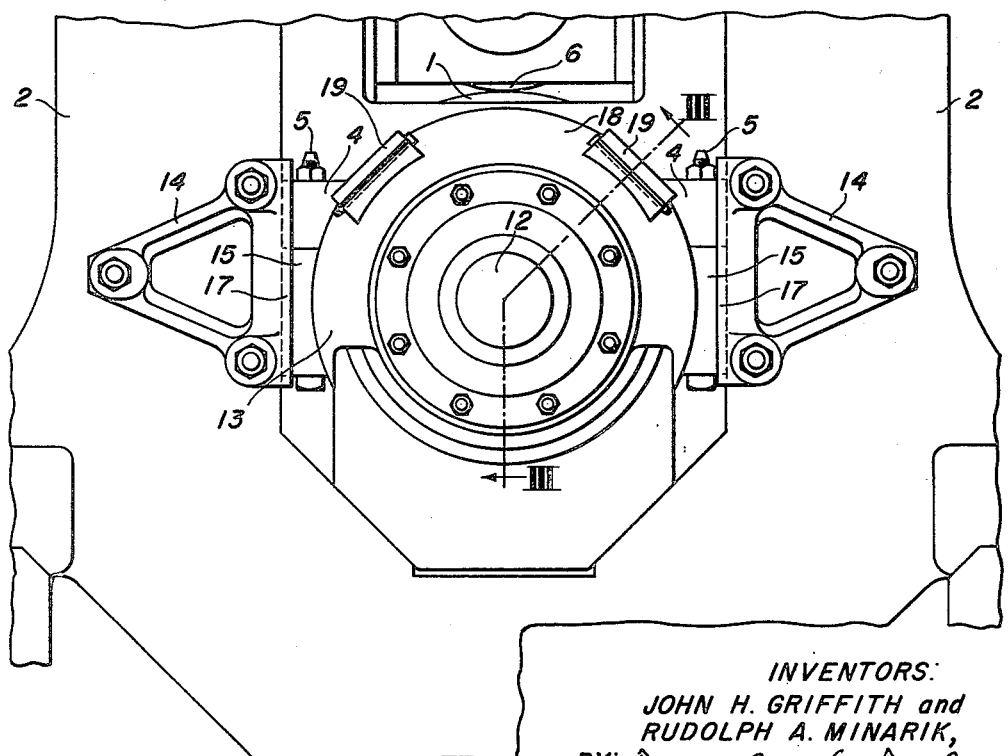
INVENTORS:
JOHN H. GRIFFITH and
RUDOLPH A. MINARIK,
BY Donald G. Dalton
their Attorney.

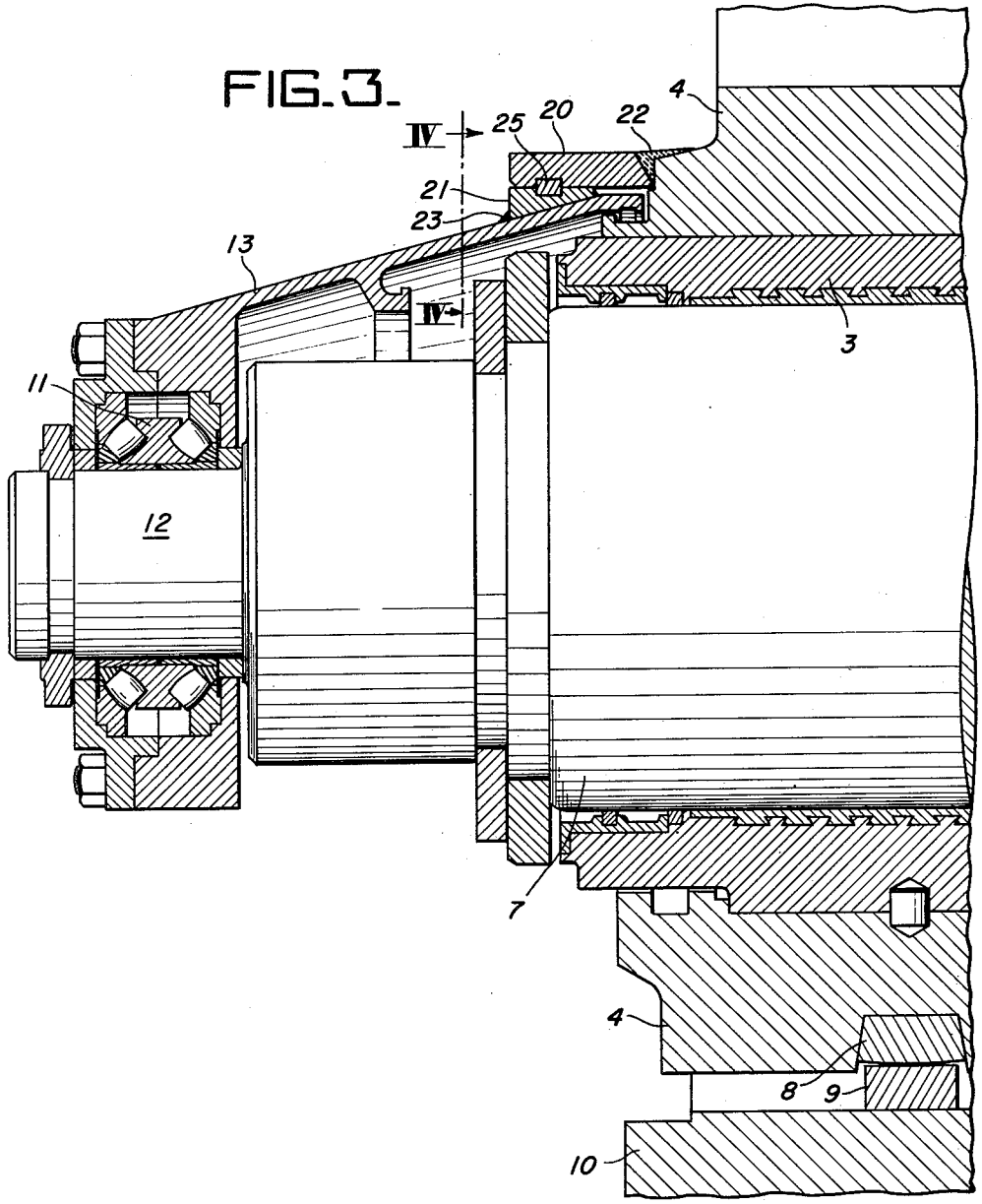

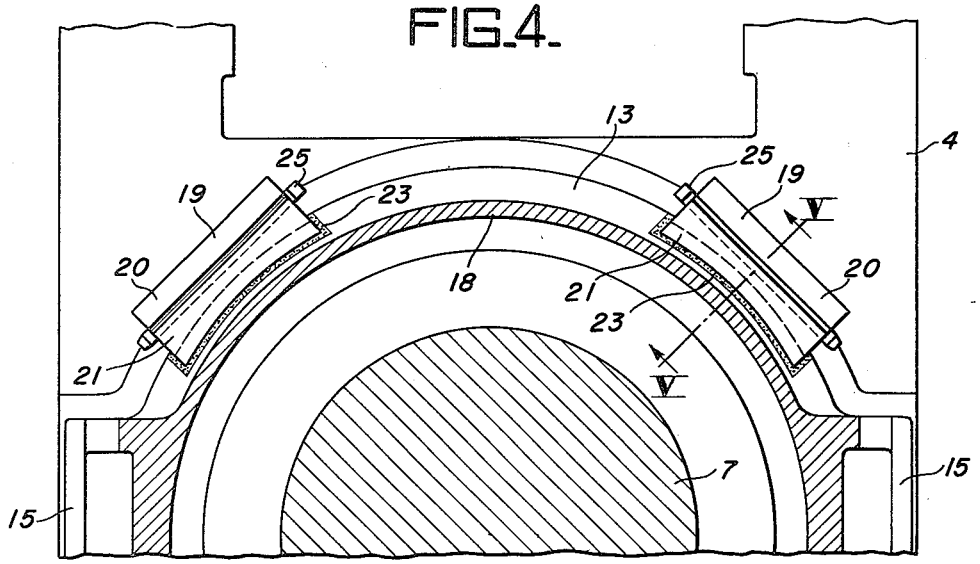
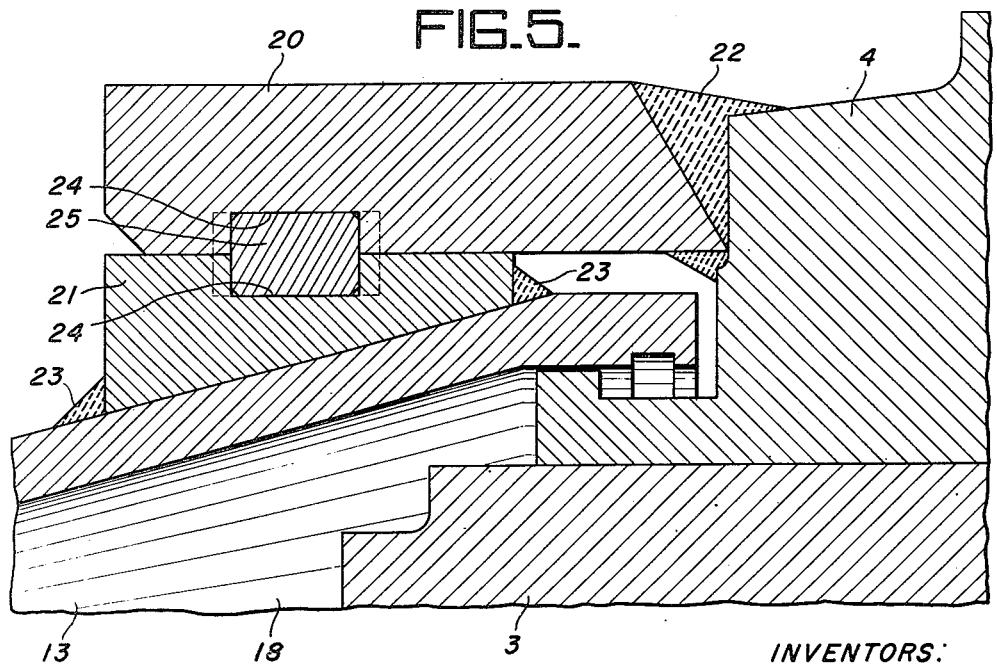
INVENTORS:
JOHN H. GRIFFITH and
RUDOLPH A. MINARIK,
BY: Donald G. Dalton
their Attorney.

Patented Aug. 31, 1954

2,687,929

UNITED STATES PATENT OFFICE 2,687,929

ANCHORAGE FOR THRUST BEARING HOODS OF ROLLING MILL ROLLS

John H. Griffith, Elizabeth, and Rudolph A. Minarik, Duquesne, Pa.

Application December 24, 1953, Serial No. 400,264

5 Claims. (Cl. 308—232)

This invention is directed to an improved arrangement of anchoring a thrust bearing hood for maintaining the roller thrust bearing on the end of a four-high rolling mill back-up roll in its correct position with relation to the mill housing.

It is conventional practice in four-high rolling mills, and particularly those intended for hot rolling of strip, to provide oil type sleeve bearings for the back-up roll journals and to provide separate roller thrust bearings on the drive end of both the top and bottom back-up rolls. The bearing chocks for the sleeve bearings are mounted for limited vertical and rocking movement in the mill housing posts and are designed to provide for limited axial floating movement of the rolls in the sleeve bearings and chocks which is restrained by the thrust bearings. Each thrust bearing is secured to the mill housing by a hood structure having lugs projecting from opposite sides thereof for engagement by adjustable keepers which are secured to the mill housing posts. The keepers have vertical slots in which the hood lugs are received to guide the vertical movement of the thrust bearing in response to rocking or vertical movement of the bearing chocks with respect to the mill housing while limiting axial movement of the thrust bearing and the roll on which it is mounted.

With hood keepers of the character referred to, the entire thrust force of the back-up roll is transferred to the thrust bearing hood and to the mill housing through the projecting lugs on the hood and the keepers in which the lugs are received and have a vertically guided sliding movement. On occasion, the lugs on the hood fail, and, when this occurs, there is no restraining force to oppose axial movement of the thrust bearing. The back-up roll is then free to float in the main bearing until it contacts the main bearing chock and thereby cause considerable damage to both the bearing and the chock.

The tendency of the hood lugs to fail increases as normal mill wear increases the clearance of the hood lugs in the keeper slots. Since the keeper slots guide the vertical movement of the hood in response to vertical and rocking movement of the bearing chock, it will be appreciated that a small clearance is provided initially between the sides of the hood lugs and the keeper slots and that this clearance increases as wear takes place. When axial thrust is transmitted to the mill housing through the hood lugs and keepers therefor, the hood lugs engage the sides of the keeper slots with a pounding action which increases with the clearance between the lugs and keeper slots. This subjects the hood lugs to extremely heavy forces and is believed to be the cause of hood lug failure.

For the purpose of eliminating failure of the thrust bearing hood lugs and consequent damage to the main bearing and bearing chock, there is provided in accordance with the principles of this invention an improved anchorage for the thrust bearing hood. To this end, the hood is anchored to the bearing chock so that the thrust is transmitted to the mill housing through the bearing chock and the hood lugs are thus relieved of the thrust on the hood. In a manner to be described, this is accomplished by welding thrust blocks to the hood and to the bearing chock in overlapping relation with a key for securing the blocks against movement axially of the roll with respect to each other.

Other objects and advantages of the invention will become apparent from the following description.

In the drawings, there is shown a preferred embodiment of the invention. In this showing:

Figure 1 is a plan view of a bearing assembly for a back-up roll in which the mill housing posts and thrust bearing hood are shown in horizontal section;

Figure 2 is a fragmentary end elevation of the apparatus shown in Figure 1;

Figure 3 is an enlarged sectional view taken substantially along the line III—III of Figure 2;

Figure 4 is an enlarged sectional view taken in the plane of the line IV—IV of Figure 3; and Figure 5 is an enlarged sectional view taken along the line V—V of Figure 4 and showing in detail the improved anchorage of this invention.

In Figure 1 of the drawings, the numeral 1 designates a back-up roll which is rotatably supported in a mill housing including laterally spaced posts 2 by a sleeve bearing 3 mounted in a bearing chock 4. As best shown in Figure 2, the bearing chock 4 is received in the space between the posts 2 and is formed in two parts which are secured together by bolts 5. As also shown in this figure, the roll 1 is a back-up roll for a work roll 6 with which it has rolling engagement. As best shown in Figure 3, the bearings 3 have bearing engagement with a roll-neck or journal 7 projecting axially from the end of the roll 1. The bottom chock 4 mounts a rocker block 8 which has supporting engagement on a block 9 carried by the mill housing base 10 to provide for rocking movement of the chock 4 and bearing 3 relative to the housing. In accordance with conventional practice, the chock 4 is provided with parts (not shown) for holding it against movement axially with respect to the rolls supported thereby.

The axial thrust of the roll is taken by a thrust bearing assembly 11 mounted on a stub shaft 12 projecting axially from the outer end of the roll neck. The thrust bearing assembly 11, in accordance with conventional practice, is secured to the outer end of a protective hood 13 which transmits end thrust to the mill housing posts 2 through hood keepers 14 rigidly secured to each of the posts. As best shown in Figure 1, the hood 13 has laterally projecting lugs 15 at opposite sides thereof which are received in vertically extending slots 16 formed in bracket members 17 constituting part of the keepers 14. Engagement of the lugs 15 in the recesses 16 prevents axial movement of the hood 13 with respect to the mill housing and is effective to transmit the thrust on the bearing 12 thereto. The engagement of the lugs 15 and the recesses 16 in addition provide guides at opposite sides of the hood which guide the vertical movement of the roll incident to vertical and rocking movement of the bearing chock 4 in the mill housing.

As has been indicated above, the lugs 15, in transmitting end thrusts of the roll to the mill housing, are subjected to extremely heavy loads and occasionally fail by breaking at their point of connection with the body of the hood 13. To eliminate this source of failure and the resulting damage to the main bearing and chocks, the inner end 18 of the hood is provided with a pair of connections 19 rigidly securing the hood 13 to the chocks 4. As best shown in Figures 3, 4 and 5, each of the connections 19 comprises an upper thrust block 20 and a lower thrust block 21 arranged in overlapping relation. The upper thrust block projects axially outwardly from the bearing chock 4 and has a welded connection at 22 thereto. The lower thrust block 21 has its lower surface curved to the contour of the inner end 18 of the hood 13 and has welded connections 23 along its edges therewith. Facing surfaces of the upper and lower blocks 20 and 21 are planar and are provided with transversely extending grooves 24 which open toward each other and provide a keyway in which a key 25 is received to prevent axial movement of the thrust blocks 20 and 21 relative to each other and thereby axial movement of the hood with respect to the bearing chock. End thrust on the hood 13 is transmitted by its thrust block 21 through the key 25 to the thrust block 20 which transmits the thrust directly to the bearing chock 4. In this manner, the connections 19 securely anchor the thrust bearing hood to a fixed reference point, the bearing chock 4, and thus provide adequate thrust support. The connections 19 thus relieve the thrust forces on the side lugs 15 of the hood which remain effective to guide the vertical movement of the bearing chock with respect to the mill housing.

It will be noted that the connections 19 are symmetrically arranged with respect to the hood 13, there being a connection 19 located in a similar angular position between each hood lug 15 and the vertical center-line of the mill. This symmetric arrangement of the connections 19 is effective to prevent rotation of the chock 4 about its vertically extending center-line in response to the transmission of thrust thereto by such connections. Attention is also directed to the fact that the anchorage provided by this invention is applicable to hoods in use on rolling mills, it being only necessary to weld the blocks 20 and 21 in position as described above and to insert the key 25 in the keyway provided by the key slots 24.

While one embodiment of our invention has been shown and described it will be apparent that other adaptations and modifications may be made without departing from the scope of the following claims.

We claim:

1. In a rolling mill roll-neck bearing assembly including a bearing chock mounted for limited vertical movement in a pair of laterally spaced mill housing posts and a thrust bearing mounted on the end of the roll-neck for absorbing end thrust, an anchoring hood having a connection at its outer end to the thrust bearing, keepers secured to the mill housing posts, said hood and keepers having inter-engaged lugs and vertically extending slots providing vertical guides at opposite sides of the hood for guiding the vertical movement of the hood and thrust bearing with respect to the mill housing posts and securing said hood to the mill housing posts against axial movement with respect thereto, a pair of thrust blocks respectively secured to the bearing chock and to said hood at the inner edge thereof, said blocks being arranged to overlap each other and respectively having transversely extending grooves opening toward each other providing a keyway extending transversely with respect to the axis of the bearing assembly, and a key received in said keyway for securing said hood to the bearing chock against axial movement relative thereto.

2. In a rolling mill roll-neck bearing assembly including a bearing chock mounted for limited vertical movement in a pair of laterally spaced mill housing posts and a thrust bearing mounted on the end of the roll-neck for absorbing end thrust, an anchoring hood having a connection at its outer end to the thrust bearing, keepers secured to the mill housing posts, said hood and keepers having inter-engaged lugs and vertically extending slots providing vertical guides at opposite sides of the hood for guiding the vertical movement of the hood and thrust bearing with respect to the mill housing posts and securing said hood to the mill housing posts against axial movement with respect thereto, and a pair of connections at the inner edge of said hood securing it to the bearing chock against axial movement relative thereto, said connections being symmetrically arranged on opposite sides of the hood and respectively positioned in similar angular positions between one of said guides and the vertical center line of the bearing assembly.

3. In a rolling mill roll-neck bearing assembly including a bearing chock mounted for limited vertical movement in a pair of laterally spaced mill housing posts and a thrust bearing mounted on the end of the roll-neck for absorbing end thrust, an anchoring hood having a connection at its outer end to the thrust bearing, keepers secured to the mill housing posts, said hood and keepers having inter-engaged lugs and vertically extending slots providing vertical guides at opposite sides of the hood for guiding the vertical movement of the hood and thrust bearing with respect to the mill housing posts and securing said hood to the mill housing posts against axial movement with respect thereto, and a pair of connections at the inner edge of said hood securing it to the bearing chock against axial movement relative thereto, said connections being symmetrically arranged on opposite sides of the hood and respectively positioned in similar angular positions between one of said guides and the vertical center line of the bearing assembly, each of said connections comprising a pair of thrust blocks respectively secured to the bearing chock and to said hood at the inner edge thereof, said blocks being arranged in overlapping relation and having transversely extending grooves opening toward each other and cooperating to form a keyway extending transversely with respect to the axis of the bearing assembly, and a key received in said keyway for securing said blocks against movement relative to each other in a direction axially of the bearing assembly.

4. In a rolling mill roll-neck bearing assembly including a bearing chock mounted for limited vertical movement in a pair of laterally spaced mill housing posts and a thrust bearing mounted on the end of the roll-neck for absorbing end thrust, an anchoring hood having a connection at its outer end to the thrust bearing, and means securing said hood to the bearing chock against movement relative thereto comprising a pair of thrust blocks respectively secured to the bearing chock and to said hood at the inner edge thereof, said blocks being arranged to overlap each other and respectively having transversely extending grooves opening toward each other providing a keyway extending transversely with respect to the axis of the bearing assembly, and a key received in said keyway for securing said hood to the bearing chock against axial movement relative thereto.

5. In a rolling mill roll-neck bearing assembly including a bearing chock mounted for limited vertical movement in a pair of laterally spaced mill housing posts and a thrust bearing mounted on the end of the roll-neck for absorbing end thrust, an anchoring hood having a connection at its outer end to the thrust bearing, keepers secured to the mill housing posts, said hood and keepers having inter-engaged lugs and vertically extending slots providing vertical guides at opposite sides of the hood for guiding the vertical movement of the hood and thrust bearing with respect to the mill housing posts and securing said hood to the mill housing posts against axial movement with respect thereto, and a connection at the inner edge of said hood securing it to the bearing chock against axial movement relative thereto.

References Cited in the file of this patent

UNITED STATES PATENTS

| Number | Name | Date |
| --- | --- | --- |
| 2,243,010 | Iversen | May 20, 1941 |
| 2,575,830 | O'Malley | Nov. 20, 1951 |